Aug. 25, 1970

U. L. SMITH 3,525,938

STATIC FREQUENCY METER

Filed Oct. 31, 1966

WITNESSES
Theodore F. Wrobel
James F. Young

INVENTOR
Uel L. Smith
BY John L. Stoughton
ATTORNEY

United States Patent Office 3,525,938
Patented Aug. 25, 1970

3,525,938
STATIC FREQUENCY METER
Uel L. Smith, Convent, N.J., assignor to Westinghouse Electric Corporation, Pittsburgh, Pa., a corporation of Pennsylvania
Filed Oct. 31, 1966, Ser. No. 590,670
Int. Cl. G01r 23/02
U.S. Cl. 324—78                                 11 Claims

ABSTRACT OF THE DISCLOSURE

A frequency indicating apparatus for a source of alternating potential in which energy in a first polarity and of a magnitude proportional to the frequency of the source is supplied to an indicating instrument during one-half cycle and in which energy in an opposite polarity and of a magnitude which is independent of the source of frequency is supplied to the indicating instrument during the other half cycle and in which such energy is supplied from a pair of buses energized from the source with a potential which is independent of changes in the magnitude of the source of potential.

---

This invention relates generally to indicating apparatus and more particularly to an apparatus for indicating the frequency of an alternating quantity to which it is connected.

Prior art frequency meters have been of various types such as the cross coil, vibrating reed, and resonant types among others. These types all require mechanisms and external parts that are individual to frequency meters. These individual parts considerably increase the tooling cost and the required inventory of stocked parts.

Another form of prior art frequency meter utilizes a standard direct current instrument energized by a frequency sensitive network having an output capable of operating direct current instruments. This type contains one or more resonant circuits, a voltage regulator and means to rectify the output supplied to the instrument. Apparatus illustration of this type of frequency meter is found in my Pat. No. 2,993,170 dated July 18, 1961 and entitled "Alternating Current Responsive Devices."

The frequency meter of the present invention embodies a simple and inexpensive non-resonant circuit for energizing a basic indicating ammeter or voltmeter which preferably is a D'Arsonval direct current instrument. The subject meter utilizes readily available components such as rectifying diodes, Zener diodes, condensers, resistors, etc. and is insensitive to the circuit voltage.

An object of this invention is to provide a new and improved frequency meter.

A further object of this invention is to provide such a meter which is economical of manufacture and which uses a minimum number of individually designed components.

Figure 1:
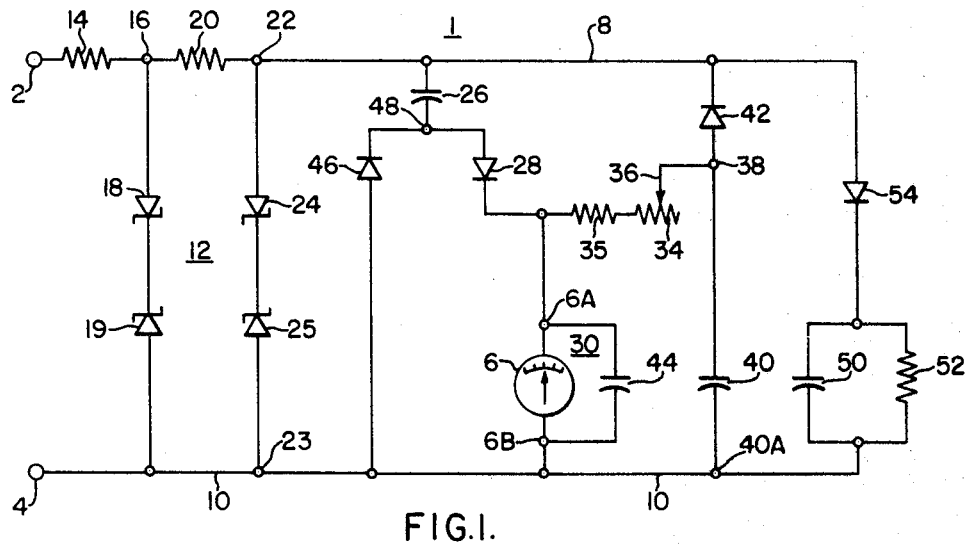
Figure 2:
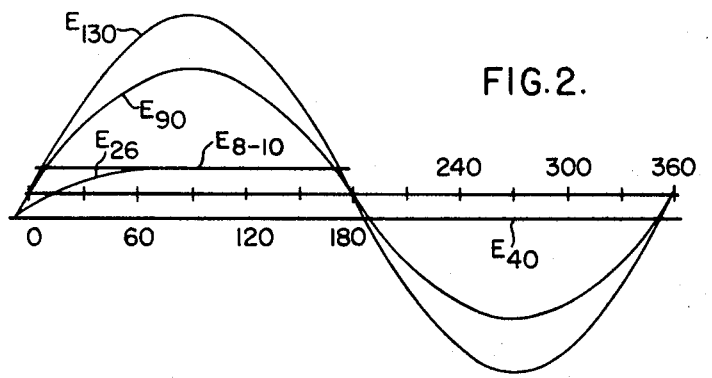
Figure 3:
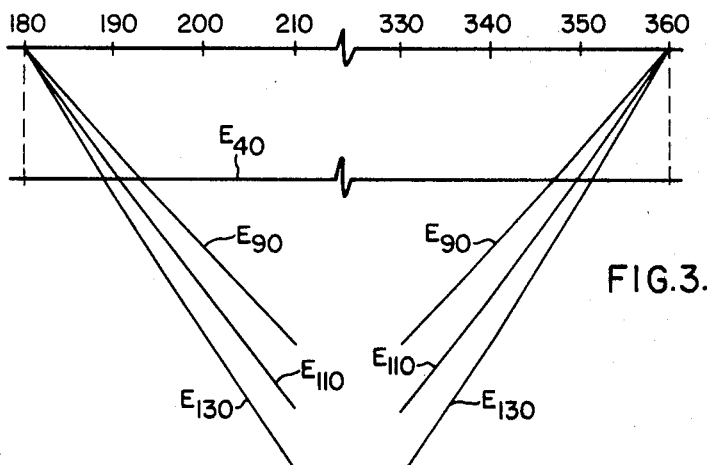

Other objects of this invention will be apparent from the description, the appended claims and the drawings, in which:

FIG. 1 schematically illustrates a frequency meter embodying my invention;

FIG. 2 is a curve illustrating certain electrical conditions present in the frequency meter; and FIG. 3 is a fragmentary view of portions of the curve of FIG. 2.

Referring to the drawings by characters of reference the numeral 1 indicates generally a frequency indicating meter or apparatus having input terminals or connections 2 and 4 adapted to be connected to a source of alternating potential the frequency of which is to be measured by the calibrated scale of an electrical quantity measuring device or indicating instrument 6. The instrument 6 may be of various types but preferably takes the form of a center-zero direct current instrument but which may be an end-zero instrument. The instrument 6 is connected by means of a pair of buses 8 and 10 to a pair of input terminals 22 and 23. A voltage controlling network 12 connects the input connections 2 and 4 to the input terminals 22 and 23.

The network 12 may take any of various forms whereby the magnitude of the voltage applied to the input connections is limited to a predetermined desired value less than the peak value of the minimum rated voltage of the frequency meter 1.

As illustrated, the network 12 comprises first and second voltage dropping resistors 14 and 20 connected in series between the input connection 2 and the input 22. A first pair of oppositely poled or back-to-back connected Zener diodes 18 and 19 are connected between the common terminal 16 of the resistors 14 and 20 and the bus 10 which is connected to the other input connection 4. A second pair of oppositely poled or back-to-back connected Zener diodes 24 and 25 is connected between the terminal 22 and the bus 10. This network 12 acts to clip the half cycles of the voltage applied to the connections 2 and 4 to a value which is a small portion of the peak value of the applied voltage as indicated by the curve $E_{8-10}$. A suitable value for the voltage $E_{8-10}$ is 25–28 volts.

The breakover voltage of the Zener diodes 18 and 19 is not critical and may be selected as some desired value between the peak value of the minimum RMS rated voltage of the meter 1 and the lower breakover voltage of the Zener diodes 24 and 25. The set of diodes 18 and 19 could be omitted but are preferably utilized to permit a more stable regulation of the voltage $E_{8-10}$ which appears between the buses 8 and 10. If this frequency indicating apparatus is rated at about 115 volts RMS and is rated to indicate a mean frequency of 60 Hz., a breakover voltage of 82 volts is suitable for the diodes 18 and 19 and a breakover voltage of 25–28 volts is suitable for the diodes 24 and 25. The resistors 14 and 20 may be rated at 1600 ohms-5 watts and 2000 ohms-3 watts respectively.

The instrument 6 is connected between the buses 8 and 10 by first and second energizing circuits. The first energizing circuit is frequency sensitive and extends from the bus 8 through a capacitor 26, a diode 28, and the instrument 6 to the bus 10. The diode 28 is poled to conduct when the bus 8 is positive with respect to the bus 10. The second energizing circuit is frequency insensitive and is energized from a capacitor 40 through resistors 34 and 35. The capacitor 40 is connected between the buses 8 and 10 through a diode 42 which is poled to conduct when the bus 10 is positive with respect to the bus 8. The common connection 38 of the diode 42 and capacitor 40 is connected to a movable tap 36 of the resistor 34 and therethrough to one terminal 6A of the instrument 6. The other terminal 6B of the instrument 6 is connected to the bus 10 and therethrough to the free terminal 40A of the capacitor 40.

The R/C time constant of the resistor 35 and the capacitor 40 is sufficiently large to maintain substantially its full potential during the half cycles in which bus 10 is positive with respect to bus 8 when the apparatus 1 is being operated at its minimum design frequency even though some current flows through the resistor 34. With this relationship the potential across the capacitor 40 is maintained at the voltage level determined by the Zener diodes 24 and 25 of the voltage controlling network 12 and the electrical quantity supplied thereby to the instrument 6 and a shunt connected filter capacitor 44 is independent of the voltage supplied to the terminals 2 and 4. The filter capacitor 44 reduces the AC component of the energizing quantities supplied to the instrument 6 and thereby tends to smooth out erratic movement or vibration of the instrument pointer. If the instrument 6 has a large inertia (electrical and/or mechanical) the shunt capacitor 44 may be omitted. The presence of the capacitor 44 permits the use of a greater range of DC instruments for the instrument 6. If the capacitor 26 has a rating of 1 mfd. the capacitor 44 may have a rating of 100 mfd.

The time constant of the charging circuit for the capacitors 26 and 44 is such that the capacitor 26 will substantially reach its maximum charge as determined by the voltage between the buses 8 and 10 in a time interval which is not greater than the time period of one-half cycle of the maximum frequency that the apparatus 1 is designated to measure and may reach such charge at a substantially lesser time as indicated by the curve $E_{26}$. The capacitor 26 must be discharged to a predetermined value each negative half cycle. For this purpose a diode 46 is connected between the bus 10 and the common terminal 48 of the diode 28 and capacitor 26. As arranged, this discharge circuit not only discharges the capacitor 26 but causes it to charge in the reverse polarity to substantially the potential between the buses 8 and 10 during the negative half cycle in which the bus 10 is positive with respect to the bus 8.

A loading circuit is connected between the buses 8 and 10 to balance any uneven loading on the oppositely poled Zener diodes 18–19 and 24–25. This circuit includes a capacitor 50 connected in parallel with a resistor 52 and the parallelly connected capacitor 50 and resistor 52 are connected in series with a diode 54 between the buses 8 and 10.

The frequency meter 1 is used by connecting its input connections 2 and 4 to the source of alternating potential, the frequency of which is to be indicated by the instrument 6. The voltage of the source of alternating potential can vary widely but preferably is substantially greater than the regulated output voltage established between the buses 8 and 10 by the voltage limiting network 12. This relationship is indicated in FIGS. 2 and 3 by the curves $E_{8-10}$, $E_{90}$ and $E_{130}$.

During the positive half cycle in which the bus 8 is positive with respect to the bus 10 charging current flows between the buses through the capacitor 26, diode 28, and the network 30. During the negative half cycle in which the bus 10 is positive with respect to the bus 8, the capacitor 26 discharges through the diode 46 to an initial potential which is determined by the voltage between the buses 8 and 10. With this arrangement a predetermined magnitude of current is supplied to the network 30 for any given frequency during each positive half cycle thereof.

During the negative half cycle in which the bus 10 is positive with respect to the bus 8, current flows from the bus 10 through the capacitor 40 and the diode 42 to the bus 8 in an amount necessary to maintain the voltage of the capacitor 40 substantially at the voltage between the buses 8 and 10. The capacitor 40 should have sufficient capacity relative to the magnitude of the resistance of the resistor 35 so that it will not appreciably discharge during the positive half-cycle. Suitable values of capacitance and resistance for the capacitor 40 and resistor 35 are 100 mfd. and from 9 to 10 thousand ohms respectively. The resistor 34 may have a resistance of 125 ohms and is used for calibration purposes. With applicant's arrangement the capacitor 40 supplies a voltage $E_{8-10}$ which is essentially a DC voltage insensitive to changes in magnitude of the RMS value of the voltage applied to the connections 2 and 4.

It has been found experimentally that without the provisions of the capacitor 40 and its connections to the network 30 through the resistor 35, that the instrument is not insensitive to changes in the RMS voltage applied to the connections 2 and 4. It is believed that the reason for this is due to the errors which would be introduced during the negative half cycles as illustrated in FIG. 3 wherein the line $E_{40}$ represents the breakover voltage of the Zener diode 24 as well as the substantially constant voltage to which the capacitor 40 of applicant's inventions is charged. The partial curves $E_{90}$, $E_{110}$ and $E_{130}$ show the instantaneous values of the voltage applied to the connections 2 and 4 during the first and last 30 degrees at RMS voltages of 90, 110 and 130 respectively. Without the capacitor 40, and sufficient resistance to cause it to maintain its substantially constant value of voltage thereacross, the frequency insensitive energizing quantity during the negative half cycle of and at an RMS value of 90 volts would follow the curve $E_{90}$ while at an RMS value of 130 volts it would follow the curve $E_{130}$ between the base line and the line $E_{40}$. As is apparent in FIG. 3, the area under the line $E_{40}$ would then vary with changes in the RMS value of the voltage applied to the connections 2 and 4. When the capacitor 40 and the required resistance is utilized the line $E_{40}$ is always substantially parallel to and spaced a fixed distance from the base line throughout the negative half cycles as well as the positive half cycles whereby a frequency insensitive quantity is continually applied to the network 30 during not only the negative half cycle but during the entire cycle whereby this quantity remains substantially constant irrespective of any changes in magnitude of the RMS voltage applied to the connections 2 and 4.

The magnitude of this quantity supplied to the network 30 is adjusted in magnitude by adjusting the tap 36 of the resistor 34 so that at a desired frequency the net integrated magnitudes of the quantities supplied to the network 30 from the capacitor 40 and from the charging of the capacitor 26 will provide a resultant energization of the network 30 which causes the instrument pointer to assume its desired positions. When the frequency increases, the integrated magnitude of the quantity supplied due to the capacitor 26 will increase and conversely whereby the pointer of the instrument 6 will move relative to the instrument indicia. Any changes in RMS value of the voltage supplied to the connections 2 and 4 will have no effect on the quantity supplied from the capacitor 40. The capacitor 26 always receives a substantially constant charge each positive half cycle. When these two quantities are supplied in opposite polarity the net result is sensitive to changes in frequency but insensitive to changes in the supplied voltage.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

What is claimed and is desired to be secured by U.S. Letters Patent is as follows:

1. A frequency sensitive apparatus comprising a pair of input connections adapted to be connected to a source of alternating potential the frequency of which is to be sensed, a pair of input terminals, a voltage limiting device in circuit between said connections and said terminals and effective to limit the maximum value of the voltage which may occur between said input terminals, said maximum value being less than the rated voltage value of said apparatus, a reactive device, an energy storage device, a plurality of unidirectional current conducting elements, an electrical quantity measuring device which measures the resulting value of two electrical quantities supplied thereto, a first circuit connected between said terminals and including said reactive device connected in series with a first of said unidirectional current elements and with said measuring device for energization of said measuring device with a first of said two quantities, said first unidirectional element being polarized to provide said first quantity to said measuring device in a first polarity, a second unidirectional current conducting circuit connected between said terminals and including said energy storage device connected in series with a second of said unidirectional current elements whereby said storage device is charged with a unidirectional electrical quantity, voltage dropping means, a third circuit connecting said storage device to said measuring device in series with said dropping means for energization of said measuring device with a second of said two quantities, said third circuit being connected to energize said measuring device with said second quantity in a second polarity opposite to said first polarity whereby said measuring device is energized with said difference value of said quantities.

2. The combination of claim 1 in which said voltage dropping means is an impedance, the impedance of said first and second circuits is such that said reactive device and said storage device substantially reach their maximum charged condition in a time interval which is no greater than the time interval of one-half cycle of the maximum rated frequency of the frequency sensitive apparatus and the relative magnitudes of said dropping means and of the capacity of said storage device are such that said storage device will maintain a substantially constant charge for at least one-half cycle of the minimum rated frequency of the frequency sensitive apparatus.

3. The combination of claim 2 in which said reactive device is a first capacitor and a second capacitor is connected in shunt with said measuring device.

4. The combination of claim 3 in which a discharge circuit means connects said first capacitor between said input terminals, said discharge circuit means includes a third unidirectional current element, said third unidirectional element is connected in shunt with said measuring device and said first unidirectional element and in series with said first capacitor, said first unidirectional element is poled to conduct during one polarity of energization of said input terminals and said third unidirectional element is poled to conduct during the other polarity of energization of said input terminals.

5. The combination of claim 4 in which said energy storage device is a third capacitor, said impedance is a resistor, and said second unidirectional element is poled to charge said third capacitor during periods in which the polarity of the energization of said input terminals is opposite to said given polarity.

6. The combination of claim 5 in which said voltage limiting device comprises a pair of Zener diodes connected in series between said input terminals and a voltage dropping resistor connected in series between one of said input connections and one of said input terminals.

7. The combination of claim 6 in which there is provided a loading circuit connected between said input terminals.

8. A frequency measuring apparatus for connection to a source of alternating potential the frequency of which is to be determined comprising, a pair of input connections for connection to the source of potential the frequency of which is to be measured, a pair of buses, a nonreactive voltage dropping element connecting one of said connections to one of said buses, bidirectional voltage limiting means connected in series with said voltage dropping element between said input connections for limiting the maximum value of the alternating potential supplied to said buses, said maximum value being less than the rated magnitude of the input potential to said measuring apparatus, an electrical quantity measuring device which measures the resulting value of two electrical quantities supplied thereto, first and second diodes, a first and a second capacitor, resistive means, a first circuit connected between said buses and including in series connection said instrument and said first diode and said first capacitor for charging said first capacitor in a first polarity through said first diode at one relative polarity of said buses, a second circuit connected between said buses and including in series circuit said second diode and said second capacitor for charging said second capacitor in a second polarity at another relative polarity of said buses, said second polarity being opposite to said one relative polarity, a discharge circuit connected to said first capacitor for removing the charge of said first polarity which resulted from the flow through said first diode, and a third circuit including said resistive means connecting said second capacitor in shunt with said instrument, said third circuit connecting said second capacitor such that the direction of the current flow through said measuring device due to said second capacitor is opposite to the direction of current flow through said measuring device due to said first diode, the magnitudes of the resistance of said resistor and of the capacitance of said second capacitor being such that said second capacitor will maintain a substantially constant voltage therein for at least the time interval of the minimum rated frequency of said measuring apparatus.

9. The combination of claim 8 in which said discharge circuit for said first capacitor is connected between said buses in shunt with said instrument and said first diode, and in which said discharge circuit includes a third diode.

10. The combination of claim 9 in which the time constant of said first circuit is such that said first capacitor will charge substantially to a maximum value corresponding to the potential between said buses in a time interval not greater than the time period of one-half cycle of the maximum rated frequency of the frequency measuring apparatus, and in which the time constant of said discharge circuit is such that said first capacitor will charge substantially to a maximum value corresponding to the potential between said buses in a second polarity in a time interval not greater than the time period of one-half cycle of the maximum rated frequency of the frequency measuring instrument.

11. The combination of claim 10 in which an asymmetric current conducting loading circuit is connected between said buses, said loading circuit comprising a fourth capacitor and a third resistor connected in shunt with each other and in series with a fifth diode.

References Cited

UNITED STATES PATENTS

| 2,955,202 | 10/1960 | Scourtes. |
| 3,049,631 | 8/1962 | Taylor. |
| 3,219,926 | 11/1965 | Dion. |

FOREIGN PATENTS

| 1,026,196 | 4/1966 | Great Britain. |
| 1,167,972 | 4/1964 | Germany. |

ALFRED E. SMITH, Primary Examiner

U.S. Cl. X.R.

307—233